March 18, 1930. G. M. NELL 1,751,287
MOUNT FOR PERCUSSIVE DRILLS
Filed Dec. 24, 1927

INVENTOR.
Gustave M. Nell
BY
Ira L. Nickerson
ATTORNEY.

Patented Mar. 18, 1930

1,751,287

UNITED STATES PATENT OFFICE

GUSTAVE M. NELL, OF DETROIT, MICHIGAN, ASSIGNOR TO CHICAGO PNEUMATIC TOOL COMPANY, OF NEW YORK, N. Y., A CORPORATION OF NEW JERSEY

MOUNT FOR PERCUSSIVE DRILLS

Application filed December 24, 1927. Serial No. 242,356.

This invention relates to supporting means for percussive machines with particular reference to shell mounts provided with feeding means for advancing the machine mounted thereon toward the work.

Among the objects of the invention are to overcome or greatly to reduce breakage, to provide cushioning means between the percussive machine and the mount, and in general to improve prior supports for machines of the described type in the interests of more efficient and satisfactory service.

In order to illustrate the invention concrete embodiments thereof are shown in the accompanying drawings, in which.

Figure 1:
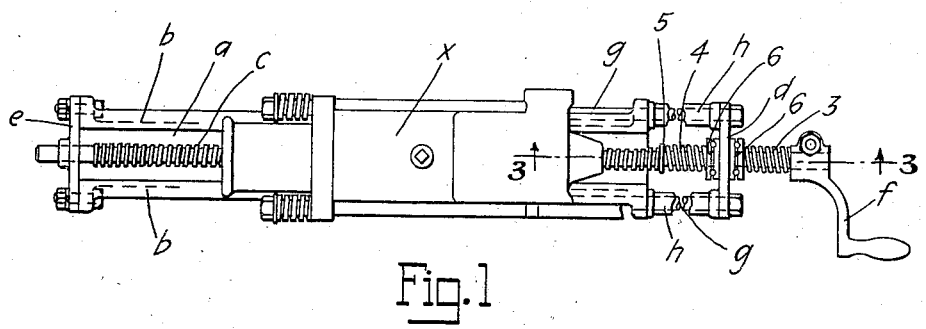
Fig. 1 is a top plan view of a shell mount with a rock drill supported thereon.
Figure 2:
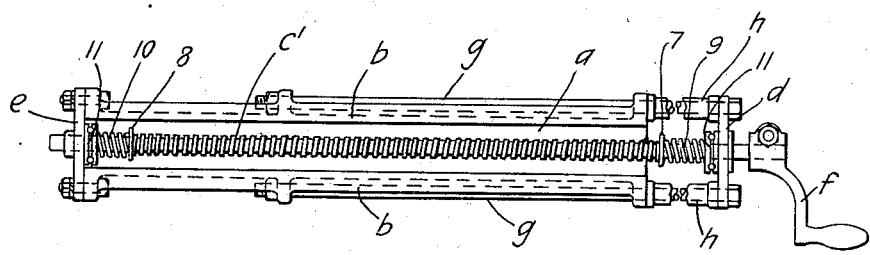
Fig. 2 is a similar plan view of a shell mount (without the drill) showing a modification.
Figure 3:
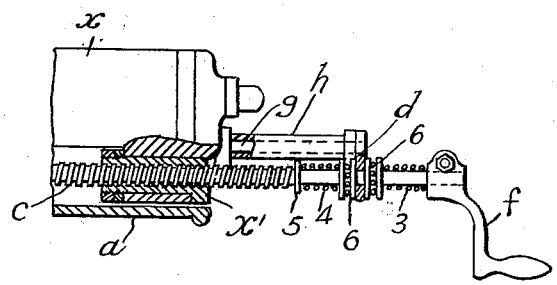
Fig. 3 is a sectional view substantially on the line 3—3 of Fig. 1 showing certain parts in elevation.

Each of the shell mounts shown in Figs. 1 and 2 comprises an elongate channel-shaped casting or forging $a$ having sides $b$ provided with axial recesses or grooves slidingly to receive the projecting flanges or wing portions (not shown) of a drill $x$ mounted thereon. Each shell mount has a feed screw $c$ disposed in the channel portion thereof to cooperate with the feed nut $x'$ (Fig. 3) on the drill $x$ in moving the drill longitudinally of the mount. Screw $c$ is supported in bearings provided by rigid supports $d$ and $e$ at opposite ends of the drill mount and may be rotated by handle $f$. Support $d$ may be rigidly maintained in spaced relation with the shell proper $a$ by spacing sleeves $h$ on the shell rods $g$.

In accordance with the present invention feed screw $c$ is arranged for movement relative to shell $a$ and its bearing supports $d$ and $e$ by having reduced portions for axial sliding movement in the bearings provided by its supports. In the form shown in Figs. 1 and 3, yielding limited movement of feed screw $c$ is permitted by resilient means, such as coil springs 3 and 4, disposed upon the reduced portion of the feed screw and on opposite sides of one of the rigid bearing supports, such as $d$. Spring 3 is interposed between handle $f$ and support $d$ to permit movement of screw $c$ to the left, while spring 4 is interposed between support $d$ and a suitable stop on screw $c$, which may be a shoulder formed by the reduced portion of the screw or a washer 5 thereby permitting yielding movement of the screw to the right. Suitable thrust receiving means, such as the ball thrust washers 6, may be interposed between support $d$ and springs 3 and 4 respectively.

Fig. 2 shows a slightly different arrangement for permitting limited yielding movement of the feed screw relative to the shell proper. As in Fig. 1, bearing supports $d$ and $e$ for feed screw $c'$ are rigidly positioned upon the shell mounting and the feed screw has reduced ends permitting sliding movement of the latter in the bearings of supports $d$ and $e$. Interposed between stops (such as the shoulders formed by the reduced ends thereof or stop washers 7 and 8) and the respective adjacent bearing supports are resilient means in the form of coil springs 9 and 10. Spring 9 permits movement of the feed screw to the right and spring 10 permits its movement to the left. As in Fig. 1 thrust washers 11 of the ball or any other suitable type may be interposed between springs 9 and 10 and the respective adjacent bearing supports $d$ and $e$.

While preferred forms of the invention have been herein shown and described, it is to be understood that the invention is not limited to the specific details thereof, but covers all changes, modifications and adaptations within the scope of the appended claims.

I claim as my invention:—

1. The combination with a percussive drill of a shell mounting providing slide ways for said drill, mechanism including a feed screw for moving said drill on said mounting, said mounting providing fixed bearings for said screw, and means permitting limited yielding movement of said screw relative to said bearings for absorbing the shocks and vibration incident to the operation of the drill.

2. The combination with a percussive drill of a shell mounting providing slide ways for said drill, mechanism including a feed screw for moving said drill on said mounting, said mounting providing fixed bearings for said screw, and resilient means on said screw arranged to permit yielding movement of the latter for absorbing the shocks and vibration incident to the operation of the drill.

3. The combination with a percussive drill of a shell mounting providing slide ways for said drill, mechanism including a feed screw for moving said drill on said mounting, transversely disposed means on said mounting providing fixed bearings for said screw, and means providing for limited yielding movement of said screw axially of said bearings.

4. The combination with a percussive drill of a shell mounting providing slide ways for said drill, mechanism including a feed screw for moving said drill on said mounting, transversely disposed means on said mounting providing fixed bearings for said screw, and resilient means carried by said screw providing for limited yielding movement of said screw axially for said bearings.

5. The combination with a percussive drill of a shell mounting providing slide ways for said drill, mechanism including a feed screw for moving said drill on said mounting, transverse supports on said mounting providing fixed bearings for said screw, a stop on said screw, and resilient means on said screw interposed between said stop and one of said supports for permitted limited axial movement of said screw.

6. The combination with a percussive drill of a shell mounting providing slide ways for said drill, mechanism including a feed screw for moving said drill on said mounting, transverse supports on said mounting providing fixed bearings for said screw, a stop on said screw, resilient means on said screw interposed between said stop and one of said supports for permitting limited axial movement of said screw, and a thrust bearing between said means and said support.

7. The combination with a percussive drill of a shell mounting providing slide ways for said drill, mechanism including a feed screw for moving said drill on said mounting, transverse supports on said mounting providing fixed bearings for said screw, said screw having reduced portions permitting axial movement of said screw in said bearings, and resilient means arranged yieldingly to resist movement of said screw in both directions.

8. A shell mounting for rock drills comprising a member having guide ways to receive wing projections on a drill, a feed screw for moving the drill upon said member, transverse supports providing fixed, aligned bearings for said screw, means rigidly securing said supports to said member, said screw having reduced portions permitting axial movement of said screw in said bearings, and resilient means arranged yieldingly to resist movement of said screw in at least one direction.

9. A shell mounting for rock drills comprising a member having guide ways to receive wing projections on a drill, a feed screw for moving the drill upon said member, transverse supports providing fixed, aligned bearings for said screw, means rigidly securing said supports to said member, said screw having reduced portions permitting axial movement of said screw in said bearings, and resilient means on said screw arranged yieldingly to resist movement of said screw in at least one direction.

10. A shell mounting for rock drills comprising a member having guide ways to receive wing projections on a drill, a feed screw for moving the drill upon said member, transverse supports providing fixed, aligned bearings for said screw, means rigidly securing said supports to said member, said screw having reduced portions permitting axial movement of said screw in said bearings, and resilient means on a reduced portion of said screw and engaging one of said supports yieldingly to resist movement of said screw in at least one direction.

11. A shell mounting for rock drills comprising a member having guide ways to receive wing projections on a drill, a feed screw for moving the drill upon said member, transverse supports providing fixed bearings for said screw, means rigidly securing said supports to said member, said screw having reduced portions permitting axial movement of said screw in said bearings, and resilient means on a reduced portion of said screw on opposite sides of one of said supports yieldingly to resist movement of said screw in both directions.

12. A shell mounting for rock drills comprising a member having guide ways to receive wing projections on a drill, a feed screw for moving the drill upon said member, transverse supports providing fixed bearings for said screw, means rigidly securing said supports to said member, said screw having reduced portions permitting axial movement of said screw in said bearings, and resilient means in the form of a coil spring encircling a reduced portion of said screw adjacent one of said supports for resisting movement of said screw in one direction.

13. A shell mounting for rock drills comprising a member having guide ways to receive wing projections on a drill, a feed screw for moving the drill upon said member, transverse supports providing fixed bearings for said screw, means rigidly securing said supports to said member, said screw having reduced portions permitting axial movement of said screw in said bearings, and resilient means in the form of a coil spring encircling a reduced portion of said screw adjacent one of said supports for resisting movement of said screw in one direction, and a thrust bearing between said support and said spring.

14. A shell mounting for rock drills comprising a member having guide ways to receive wing projections on a drill, a feed screw for moving the drill upon said member, transverse supports providing fixed bearings for said screw, means rigidly securing said supports to said member, said screw having reduced portions permitting axial movement of said screw in said bearings, and resilient means in the form of coil springs encircling a reduced portion of said screw on opposite sides of one of said supports for resisting movement of said screw in both directions.

15. A shell mounting for rock drills comprising a member having guide ways to receive wing projections on a drill, a feed screw for moving the drill upon said member, transverse supports providing fixed bearings for said screw, means rigidly securing said supports to said member, said screw having reduced portions permitting axial movement of said screw in said bearings, and resilient means in the form of coil springs encircling a reduced portion of said screw on opposite sides of one of said supports for resisting movement of said screw in both directions, and thrust bearings on opposite sides of said last-named support directly engaged by said springs.

Signed by me at Detroit, in the county of Wayne, and State of Michigan, this 15th day of December, 1927.

GUSTAVE M. NELL.